United States Patent [19]

Fennema et al.

[11] 3,818,191

[45] June 18, 1974

[54] AUTOMATIC NON-CONTACT RECOGNITION OF CODED INSIGNIA

[75] Inventors: Claude L. Fennema, Mountain View; Alfred E. Brain, Santa Cruz; Charles A. Rosen, Atherton; John M. Yarborough, Palo Alto, all of Calif.

[73] Assignee: Stanford Research Institute, Menlo Park, Calif.

[22] Filed: Mar. 3, 1972

[21] Appl. No.: 231,553

Related U.S. Application Data

[63] Continuation-in-part of Ser. No. 130,213, April 1, 1971, abandoned.

[52] U.S. Cl. ..... 235/61.11 E, 209/11, 250/219 DC, 235/61.12 N

[51] Int. Cl... G06k 7/14, G06k 19/06, G01n 21/30, B07c 5/34

[58] Field of Search...235/61.11 E, 61.12 N, 61.12 R, 235/61.7 B; 250/219 DC; 178/6, 8, 69; 356/24; 340/149 A, 146.3 K; 209/111

[56] References Cited

UNITED STATES PATENTS

| | | | |
|---|---|---|---|
| 2,612,994 | 10/1952 | Woodland | 209/111 |
| 3,246,126 | 4/1966 | Schlieben | 235/61.11 E |
| 3,316,392 | 4/1967 | Bailey | 235/61.12 N |
| 3,417,231 | 12/1968 | Stites | 235/61.11 E |
| 3,418,456 | 12/1908 | Hamisch | 235/61.11 E |
| 3,422,222 | 1/1969 | Lord | 178/69 |
| 3,513,320 | 5/1970 | Weldon | 250/219 DC |
| 3,553,438 | 1/1971 | Blitz | 235/61.11 E |
| 3,623,028 | 11/1971 | Yoshida | 235/61.11 E |
| 3,643,068 | 2/1972 | Mohan | 235/61.11 E |
| 3,663,800 | 5/1972 | Myer | 235/61.11 E |

*Primary Examiner*—Daryl W. Cook
*Assistant Examiner*—Robert M. Kilgore
*Attorney, Agent, or Firm*—Lindenberg, Freilich & Wasserman

[57] ABSTRACT

A system is provided for optically scanning a remotely located encoded label on a package, error detecting, verifying and decoding the same, regardless of the orientation of said package.

6 Claims, 8 Drawing Figures

INVENTORS
CLAUDE L. FENNEMA
ALFRED E. BRAIN
CHARLES H. ROSEN
JOHN M. YARBOROUGH JR.
BY Lindenberg Freilich & Wasserman
ATTORNEYS INVENTORS
CLAUDE L. FENNEMA
ALFRED E. BRAIN
CHARLES H. ROSEN
JOHN YARBOROUGH JR
BY Lindenberg Freilich & Wasserman
ATTORNEYS INVENTORS
CLAUDE L. FENNEMA JR.
ALFRED E. BRAIN
CHARLES H. ROSEN
JOHN YARBOROUGH JR.
BY Lindenberg Freilich & Wasserman
ATTORNEYS

AUTOMATIC NON-CONTACT RECOGNITION OF CODED INSIGNIA

This application is a continuation-in-part of application Ser. No. 130,213, filed Apr. 1, 1971, by these inventors, now abandoned.

FIELD OF INVENTION

This invention relates to coded insignia sensing systems and more particularly, to improvements therein.

Material-handling systems in factories, warehouses and retail outlets still require a great deal of manual labor. There is a need to be able to identify objects for example, in a grocery check-out station, for inventory control and pricing. In an airline baggage-handling system, identification of each parcel is necessary to send it on its proper route. There are similar identification problems in postal systems, assembly lines, and warehouses. In general, mechanized systems to do the pattern recognition required to solve this task would be either far to expensive or would be beyond the present state of the art. It appears that the presence of a human being is very necessary. Where articles to be identified can be appropriately tagged or marked, some machine systems for machine recognition have been devised. However, these require handheld reading devices, speical character fonts, or require that the package be properly oriented and aligned with the scanning device; otherwise, serious problems in recognition and/or decoding arise. Further, it is necessary to bring the article scanned fairly close to the scanning device in order that sufficient light be reflected from the label indicia to afford recognition. Besides light falls off with distance, the resolution of the marking on the label falls off with distance in these prior art systems further adding to the difficulty of proper decoding.

OBJECTS AND SUMMARY OF THE INVENTION

It is an object of this invention to provide an automatic, non-contact, coded insignia recognition system wherein constraints on orientation and distance are considerably relaxed over those presented by the prior art.

Yet another object of this invention is the provision of non-contact coded insignia recognition system which is fully automatic.

Still another object of the present invention is the provision of a novel and useful automatic non-contact, coded insignia recognition system.

These and other objects of the invention are achieved in a system wherein the code markings on a label or on a package are made with a fluorescent ink. A high intensity non diverging light beam, such as a laser light beam, is shined on a rotating mirror which scans the coded markings. The coded markings are on a package which is moving relative to the stationary scanner in a manner so that at least once in its passage, all of the markings will be traversed by the moving light beam from the laster which is reflected from the rotating mirror. The photocell detecting means generates pulse signals in response to light emissions from the coded insignia, which are verified and interpreted by suitable electronic circuitry.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
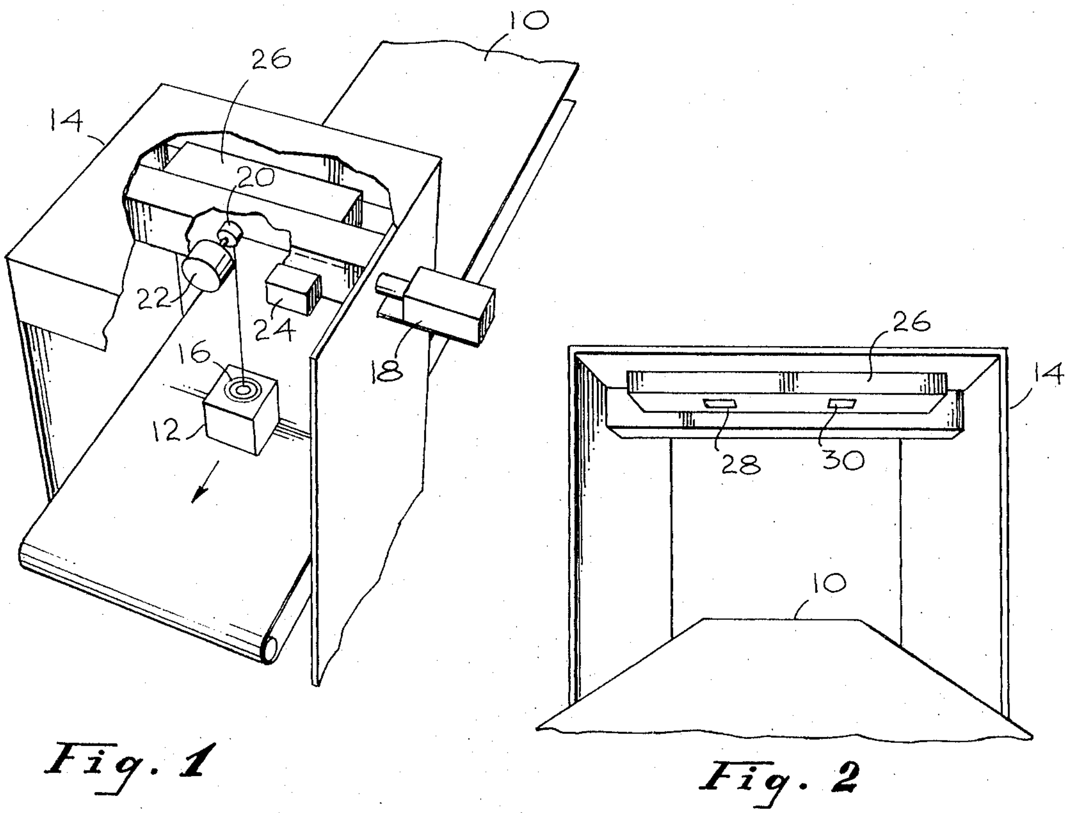
FIG. 1 is a perspective view illustrative of a suitable configuration for an embodiment of the invention.
FIG. 2 is another perspective view illustrating the entrance to the embodiment of the invention.

Referring now to FIG. 1, there may be seen in perspective an illustration of one form which the embodiment of the invention may take. A conveyor belt 10, will move a package 12, which, it should be appreciated may take any shape or form, through a detecting or inspecting region 14. The package will have a tag or a label 16 attached thereto or coded indicia stamped thereon.

The detecting region 14 merely defines the region through which a package must pass in order to be inspected by the remote indicia recognition equipment of this invention and here is shown as a rectangular tunnel, by way of example. However, it may take any desired shape or form and need not be constrained to the rectangular form shown in FIG. 1.

A high intensity, substantially non diverging light source 18, directs its light beam onto a rotating mirror 20, which is rotated by a motor 22. A preferred light source is provided by a laser. Besides the laser providing the required light intensity its substantially non diverging light beam avoids the requirement for an optical focusing which would otherwise be required to take care of packages of different sizes and thus different distances from the detecting photocells. The rotating mirror has the shape of a polyhedron, and each side thereof, as the mirror rotates, causes the laser beam to sweep from one side of the tunnel to the other. The power supply for the motor is designated by the reference numeral 24. Photocells and decoding circuitry are contained in the box 26.

FIG. 2 shows the view seen by the parcel as it enters the tunnel. The rectangle 26 contains the photocells which are behind filter windows 28 and 30. Light from the rotating mirror describes a plane through which the parcel bearing the coded indicia passes. A parcel need not have an orientation such that the coded indicia are prependicular to the illuminating plane, as is required with prior art devices, in order to insure sufficient illumination and proper decoding. Because the size of the laser beam is on the order of mils, because of its non-divergence and because of the intense illumination provided by the beam, the parcel carrying the coded indicia need not be located close to the photo detecting portion of the system. It may be remotely located and because of the small size and the intensity of the laser beam there is sufficient resolution and light provided for the detecting equipement to read and decode the coded indicia without any trouble. This provides another benefit in that the parcel size can vary from small to large which has the effect of varying the distance of the coded indicia from the photodetecting equipment. Heretofore, with prior art devices, this posed a problem since it was necessary to maintain the distance between indicia and photodetecting equipment substantially the same, regardless of the size of package.

In accordance with this invention, a laser, which provides radiation within the range from the upper part of the visual frequency, such as the blue to the ultraviolet part of the spectrum, is preferred. The coded indicia should be painted with fluorescent marking materials. The photocells, which are employed, collect the light produced by the coded indicia in response to the illumination by the laser light beam, regardless of the angle which the coded indicia makes with the incident light beam. They should also have filters to be responsive only to light of the colors selected for use in the coding.

Figure 3:
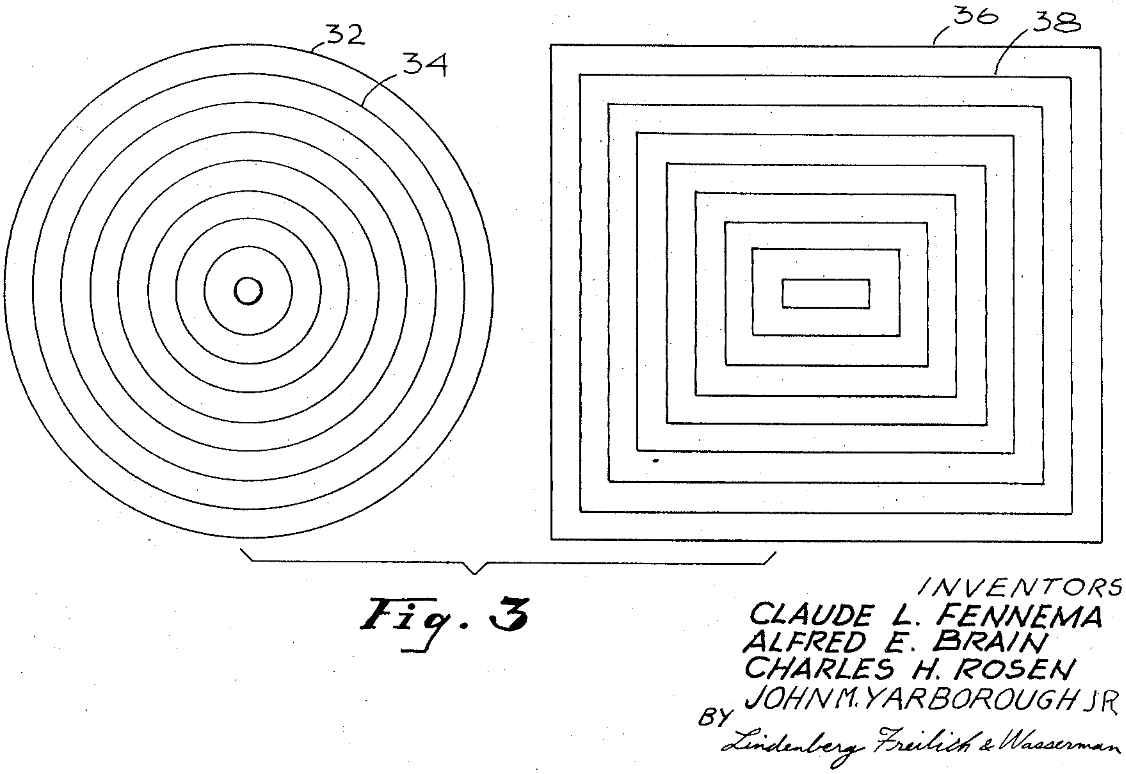
FIG. 3 illustrates suitable forms of indicia which can be employed with this invention.

FIG. 3 illustrates, by way of example, two geometric forms which the coded indicia may have, in accordance with this invention. One of these forms is circular and has a plurality of concentric rings 32, 34 by way of example and the other form comprises a plurality of concentric rectangles 36, 38 by way of example. The rectangular labels may be printed on available line printers. Each one of the rings or the rectangles, also, by way of example, may be one or the other of two colors such as red and green or it may be blank or black. Red represents a 1, green a 0. If the ring following a red ring is blank we have 1–1. If the ring following a green ring is blank we have 0—0. Blank rings only occur with digit repeats. By way of further examples, red-blank-green represents 1–1–0. Red-blank-red represents 1–1–1. Green-blank-green represents 0–0–0. Green-red-green is 0–1–0, etc. When the scanning light plane bisects the coded indicia, this is detected by the logic circuitry provided with the invention, and the code which has been read can then be decoded and utilized. It should be apparent that the number of rings or rectangles used determines the number of code bits. By way of example, it is assumed here that a 19 bit code is used.

Figure 4:
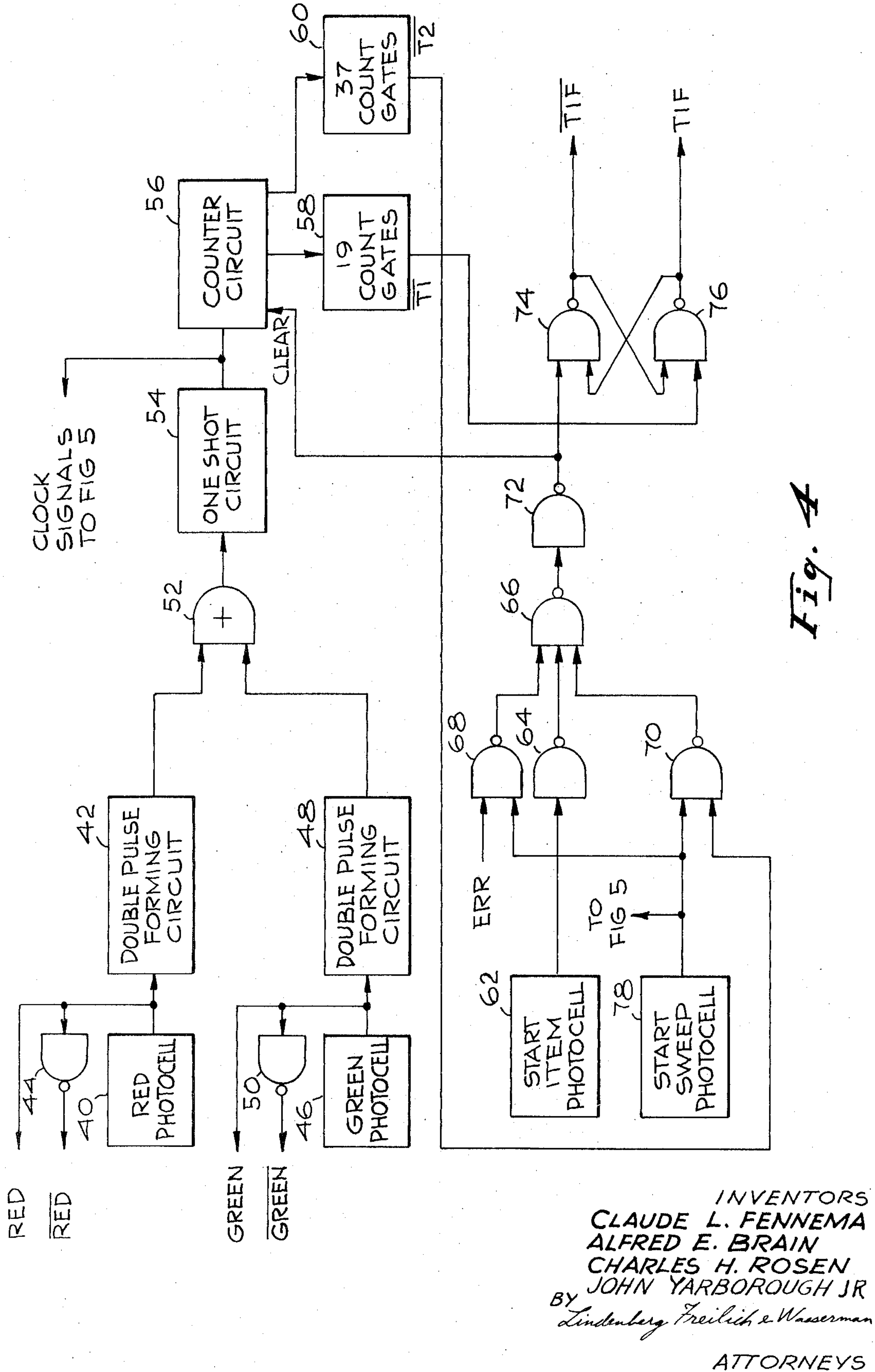
FIGS. 4 and 5 are block schematic diagrams of the logic circuitry which is embodied in this invention.
Figure 5:
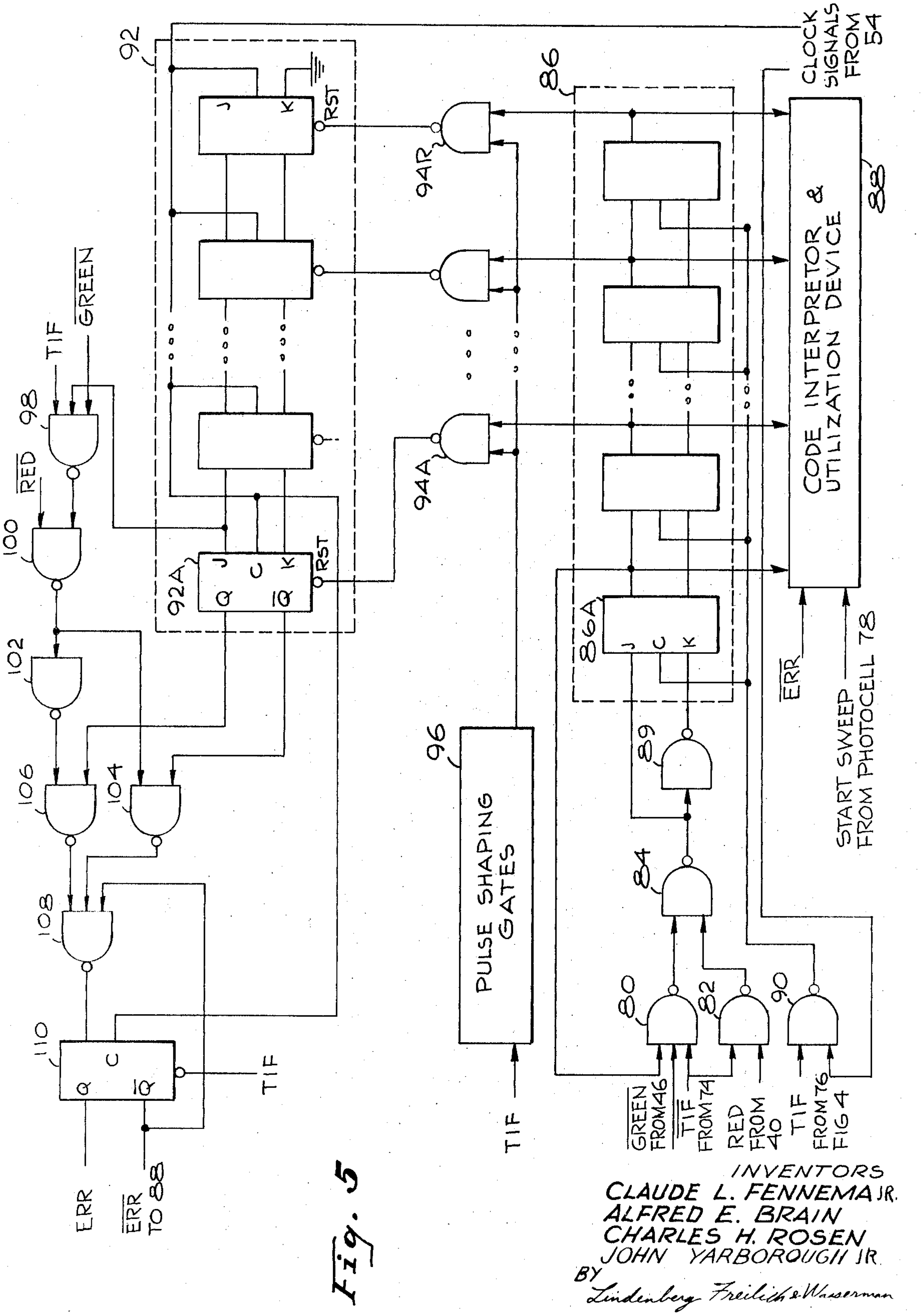

Referring now to FIGS. 4 and 5, there are shown block schematic diagrams of a suitable circuit arrangement for recognizing when the coded indicia is bisected by the light plane, whereby it can instruct the decoding apparatus to respond to the code which has been read. A red color detecting photocell 40, has its output connected to a double pulse forming circuit 42. This may be a differentiator circuit followed by a rectifier to insure that the two pulses, generated from the leading and trailing edge of the pulse generated when the laser beam crosses a red line, have the same polarity. Two pulses are necessary in order to bracket the "no color" or blank region. The output of the red photocell is also applied to a NAND gate 44, being used as an inverter, to produce the signal $\overline{\text{red}}$.

NAND gates which are herein shown as single input NAND gates, will be understood to be used as inverters and signal shapers, as is the customary engineering practice.

A green color detecting photocell 46, is connected to a double pulse forming circuit 48, and also to a NAND gate 50, being used as an inverter. The outputs of both double pulse forming circuits are applied to an OR gate 52. The output of the OR gate drives a one shot circuit 54. The one shot circuit serves as a clock circuit for the entire detecting system. The output from one shot circuit 54 drives a counter circuit 56. The counter circuit counts the number of color and "no color" transitions made by the light beam traversing the coded indicia. Only, when the light beam bisects the coded indicia will the correct number of binary bits be generated. Thus, the counter indicates when the light beam bisects the coded indicia.

One set of gates, 58, detects when the counter 56 counts all of the binary digits seen when the light beam bisects the coded indicia and travels from the outside to the center. For example, if a 19 bit code is employed, then gate 58 provides an output, represented as $\overline{\text{T1}}$ when the counter has counted to 19. A second set of gates 60, provides an output $\overline{\text{T2}}$ when the counter counts 37. The binary data read when the light beam travels from the center to the outside of the coded indicia is a mirror image to the binary data read in traversing from the outside to the center.

The remaining logic shown on FIG. 4 comprises the reset logic or clear logic for the counter, one shot and flip-flop. When an item starts moving into the detecting region 14, this is detected by a photocell designated as a "start item" photocell 62. The photocell output is applied to a NAND gate 64, which inverts it. The output of this NAND gate is applied to a NAND gate 66. The NAND gate 66 receives two other inputs from two NAND gates respectively 68, and 70. Assume at this time that these outputs are both high. The output of NAND gate 64 goes from high to low as a result of which the output of NAND gate 66 goes from low to high. The NAND gate 66 output is applied to a following NAND gate 72. Its output goes low whereupon it can reset the two NAND gate flip-flop 74, 76, 80 and also reset the counter 56. The two NAND gate flip-flop produces a $\overline{\text{T1F}}$ output in its reset state and a T1F output in its set state.

A start-sweep photocell 78 detects when the laser beam starts sweeping across the plane that it describes. This start-sweep signal is derived by applying a spot of fluorescent paint (not shown) at the start-sweep location. A blue or ultraviolet sensitive photocell is used, filtered optically to the laser radiation frequency. When the laser light beam strikes the start sweep location, the start-sweep photocell will generate a signal which is applied to the NAND gate 70. At this time, there is no $\overline{\text{T2}}$ output from the "37 count gate" 60. In the absence of $\overline{\text{T2}}$ and in the presence of a start-sweep signal, NAND gate 70 output goes from high to low as does the output of NAND gate 68 at this time. The action of the NAND gates 66 and 72 in response to these signals is the same as was previously described, they serve to clear the flip-flop, and the counter.

The ERR signal is derived from the circuit shown in FIG. 5. It arises when the code which has been read from the first half of a label is not the same as the code which is read from the second half. This occurs either due to misreading, or the fact that the light beam is not intersecting the label. The ERR signal also serves to reset the flip-flop, and counter, through the circuits just described.

Referring to FIG. 5, it will be seen that the presence of the $\overline{\text{T1F}}$ signal, which occurs during the reading of the first 19 bits of the code, enables NAND gate 80 and is also applied to a NAND gate 82. In the presence of red fluorescence the output of the red photocell 40, is applied to NAND gate 80. The output of NAND gate 80 is applied to a NAND gate 84. Its output is applied to the "J" input of the first stage 86A of a shift register 86 and to a NAND gate 88. NAND gate 88 output is connected to the "K" input of the first stage 86A. Shift pulses for the shift register are derived from the one shot circuit 54.

NAND gate 82 has as a second input a $\overline{\text{green}}$ signal which is derived from NAND gate 50 in FIG. 5. The third input to NAND gate 82 is the "one" output of the first stage 86A of shift register 86.

The shift register 104 is shifted in response to clock signals received from the one shot 72. It should be remembered that the red signal represents a one, the green signal represents zero and the blank area in between represents the same digit as is represented by the preceding color. In the presence of a red signal, NAND gate 80 applies a low input to NAND gate 84. The other input to this NAND gate is the output of NAND gate 82. AT this time it is high. NAND gate 84 will have a high output which is applied directly to the "J" input of the first stage flip-flop 104A in the register and is inverted to low by a NAND gate 108 and applied to the K input of the flip-flop. The occurrence of the clock signal causes the first stage of the shift register to assume the one state.

If after the red signal, a "no color" signal occurs then the output of NAND gate 80 is high and the output of NAND gate 82 is high, since $\overline{\text{T1F}}$ and $\overline{\text{green}}$ at this time are high signals and the third input, which is the "one" output of flip-flop 104A, is high. Thus, the output of NAND gate 82 is low. The output of NAND gate 84 is high and therefore a "one" bit is again entered into shift register 86.

Should the next signal be a green signal, then the $\overline{\text{green}}$ signal formed by the NAND gate 50 in FIG. 4 goes from high to low. This causes the output of NAND gate 82 to go high. The other input to NAND gate 84 at this time is also high since the red signal is low. Thus the output of NAND gate 84 is low. Thus a low signal is applied to the "J" input of flip-flop 86A and a high signal is applied, by the inverter 88 to the K input of the first stage of the shift register at clock time. The first stage 104A will therefore assume a zero state and the "one" bit which it contains is shifted to the second stage of the shift register.

If the signal following the green signal is a "no color" signal, the output of NAND gate 80 is high. The output of NAND gate 82 is also high. Thus NAND gate 84 will have a low output with the result that a "zero" will be entered into the first stage of the register.

From the foregoing it will be appreciated how binary digits representative of photocell signals caused by color and no color are entered into the shift register 86. Shift register 86 has as many stages as there are bits in the code, here 19 stages and will be filled with the code which has been read when the light beam bisects the coded indicia. After the shift register is filled the data in the shift register is automatically transferred to a code interpreter and utilization device 88, which merely holds it in storage and does not commence operation thereon until the occurrence of the next "start-sweep" signal from photocell.

Referring back now to FIG. 4, upon the reading of the *n*th bit from the coded indicia, the flip-flop, consisting of two NAND gates 74, 76, is driven by NAND gates 58 and the T1F signal goes high while the $\overline{\text{T1F}}$ signal goes low. The low going $\overline{\text{T1F}}$ signal prevents NAND gates 80 and 82 from transferring any further bits into the shift register 86. This is further prevented by a NAND gate 90, which, in response to a T1F signal, provides an output which blocks the application of further clock signals to shift register 86.

Each one of the stages of shift register 86, exclusive of the first, is connected via gates 94A through 94R to a separate stage of a shift register 92. The T1F signal, is applied to pulse shaping gates 96, whose output is applied to gates 94A through 94R which thereby are enabled to transfer the data in shift register 86 into the shift register 92.

After register 92 receives the contents of register 86, a checking procedure of the contents of the register is initiated. This is done by comparing the contents of register 92, as it is being shifted out backwards from the direction in which it was read into register 86, with the data being read by the photocells from the second half of the encoded indicia. This is the mirror image of the data read from the first half.

A NAND gate 98 has as inputs T1F, the output of the second stage of register 92 (herein designated as the 3rd character) and a $\overline{\text{green}}$ signal. The output of NAND gate 98 is applied to a NAND gate 100 whose other input is a $\overline{\text{red}}$ signal. The output of NAND gate 100 is applied to NAND gates 102 and 104. A second input to NAND gate 104 is the $\overline{\text{Q}}$ output of the last stage 92A (or output stage) of register 92. This is the reset output.

The output of NAND gate 102 is applied to a NAND gate 106. The second input to NAND gate 106 is the Q output of stage 92A. A NAND gate 108 receives the outputs of NAND gates 104 and 106, and also the $\overline{\text{Q}}$ output of a flip-flop.

Clock signals from one shot 54 are also applied to shift register 92 as shift pulses.

To illustrate how the circuit just described operates to check the code read from the first half of the coded indicia, assume that stages 92A and the following three stages are now respectively storing 1–1–0. If the red and green photocells at this time produce a red output indicative of a "one", then NAND gate 98 output is low, NAND gate 100 output is high, NAND gate 104 output is high. NAND gate 102 output is low and NAND gate 106 output is high. NAND gate 108 output is therefore low and flip-flop 110 remains reset with its $\overline{\text{ERR}}$ output high. Had a green signal been read at this time instead of a red signal or had the "3rd character" digit been a zero instead of a one then the error flip-flop would have been set to produce an ERR signal.

Afer the clock pulse, the stage 92A will store a 1 bit and the following two stages will store zero and zero respectively. It should be remembered that after a color, a "no color" is read. At this time NAND gate 98 output is high, NAND gate 100 output is low. NAND gate 104 output is high, NAND gate 102 output is high. NAND gate 106 output is high and therefore NAND gate 108 output remains low. Flip-flop 110 remains reset upon the occurrence of a clock pulse.

After the clock pulse, stage 92A stores a zero, as does the foloowing stage. This time the $\overline{\text{green}}$ signal goes low. The output of NAND gate 98 is high and the output of NAND gate 100 is low. NAND gate 104 output is high, NAND gate 102 output is high. NAND gate 106 output is high. Therefore the low output of NAND gate 108 will not drive flip-flop 110.

Should the red photocell have produced an output signal at this time, or should a "no color" have been detected the flip-flop 110 would have been set and an ERR signal would have been produced. The appearance of an ERR signal aborts the operation of the code interpreter and utilization device 88 and clears the counter circuit 56. The $\overline{T1F}$ signal appearing resets the flip-flop 110. The system is now ready for the next reading.

It is easily possible to think of various materials handling systems where different information might be placed conveniently on a parcel at different locations. The identification tag may best be put, for example, on the item at its source; but a zip code might best be placed on the item just as it is to be mailed. The coding system to be proposed allows such tagging procedures and may also allow tags to be stocked in bulk in certain applications.

Considering now tags such as are represented in FIG. 3, assume that each tag is divided into two fields: one field, which we call the A Field can constitute a number of the outer rings and the remainder of the tag constitutes a second field, which we will call B Field. These fields are distinguished by the fact that the A Field identifies tags and the B Field contains the tag information. Thus, the information in the A Field can instruct a computer where to place the information contained in the B Field. It will be appreciated that the B Field information can differ as widely as is desired or required.

Another possible use of a tag which has two fields is to use the B Field to specify the digit and the A Field to specify the decimal place. Then the value of a collection of tags would then be $$\sum_{k=1}^{n} B_K 10^{AR}$$

Figure 6:
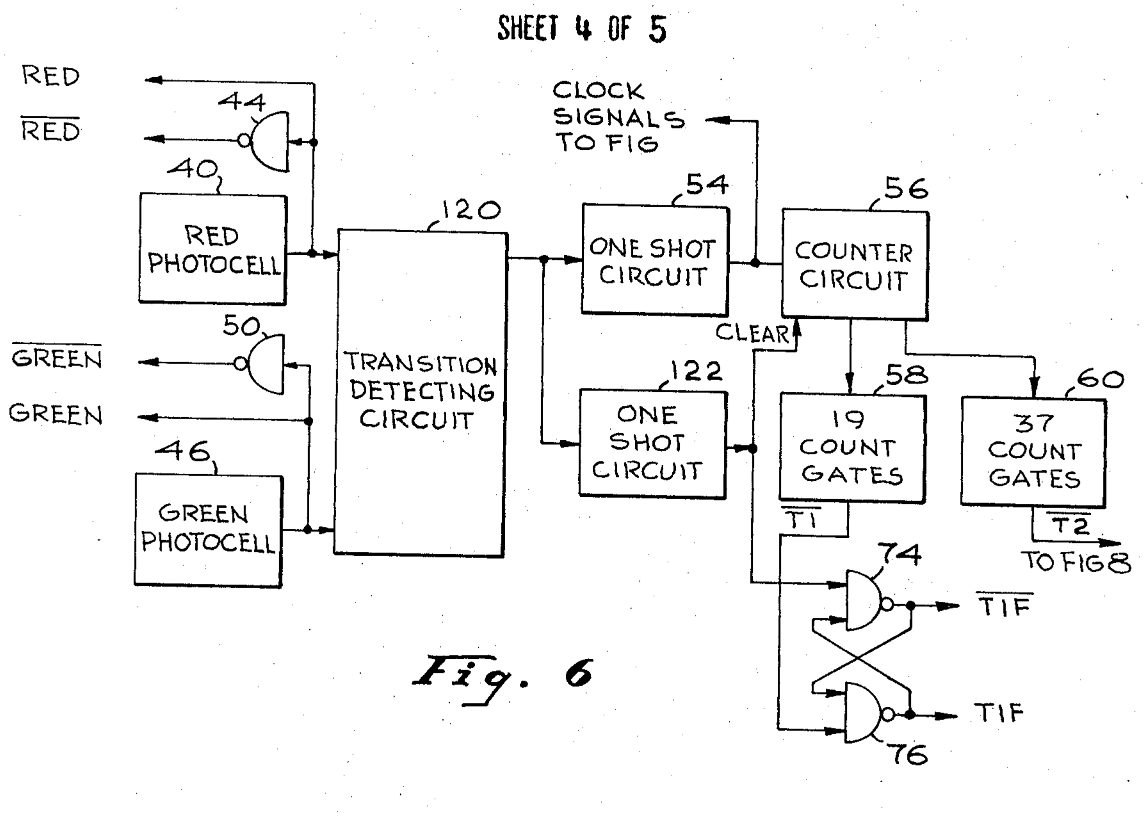
FIGS. 6, 7 and 8 are block schematic diagrams of the logic circuitry used in a second embodiment of this invention.
Figure 7:
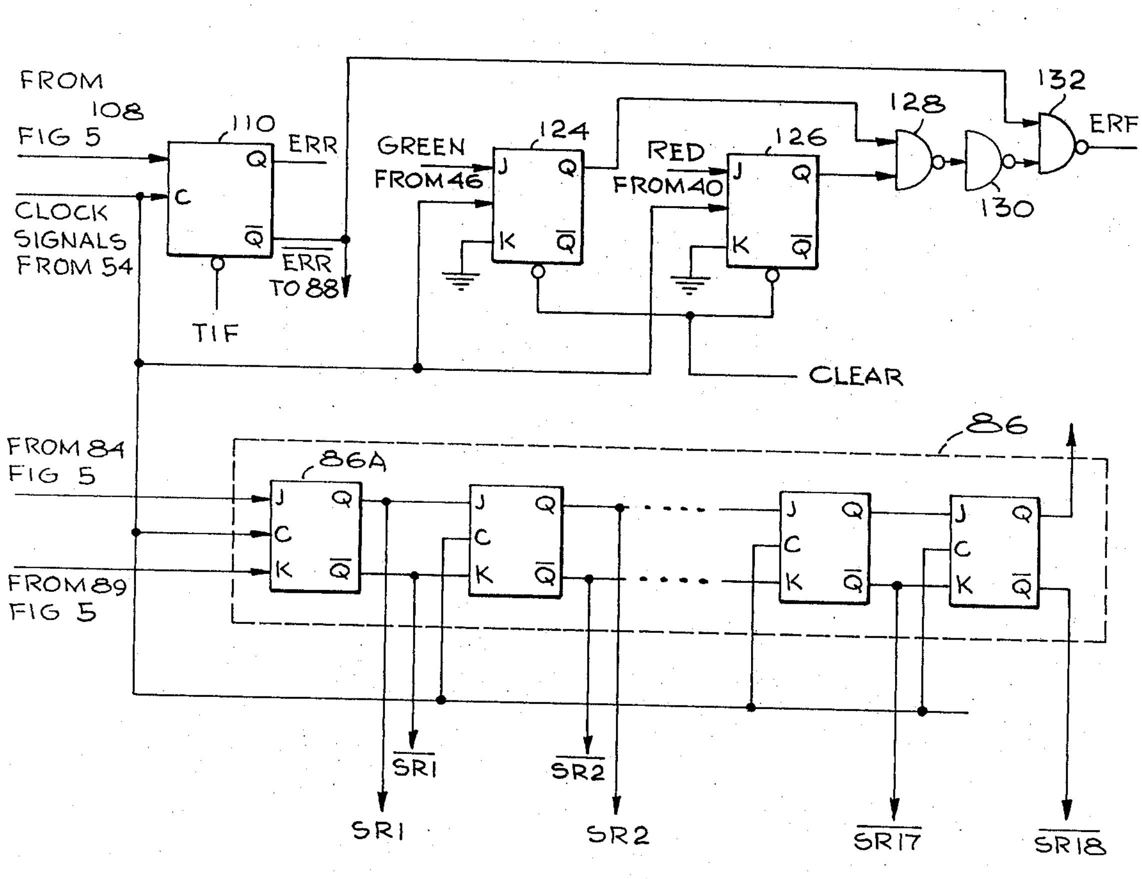
Figure 8:
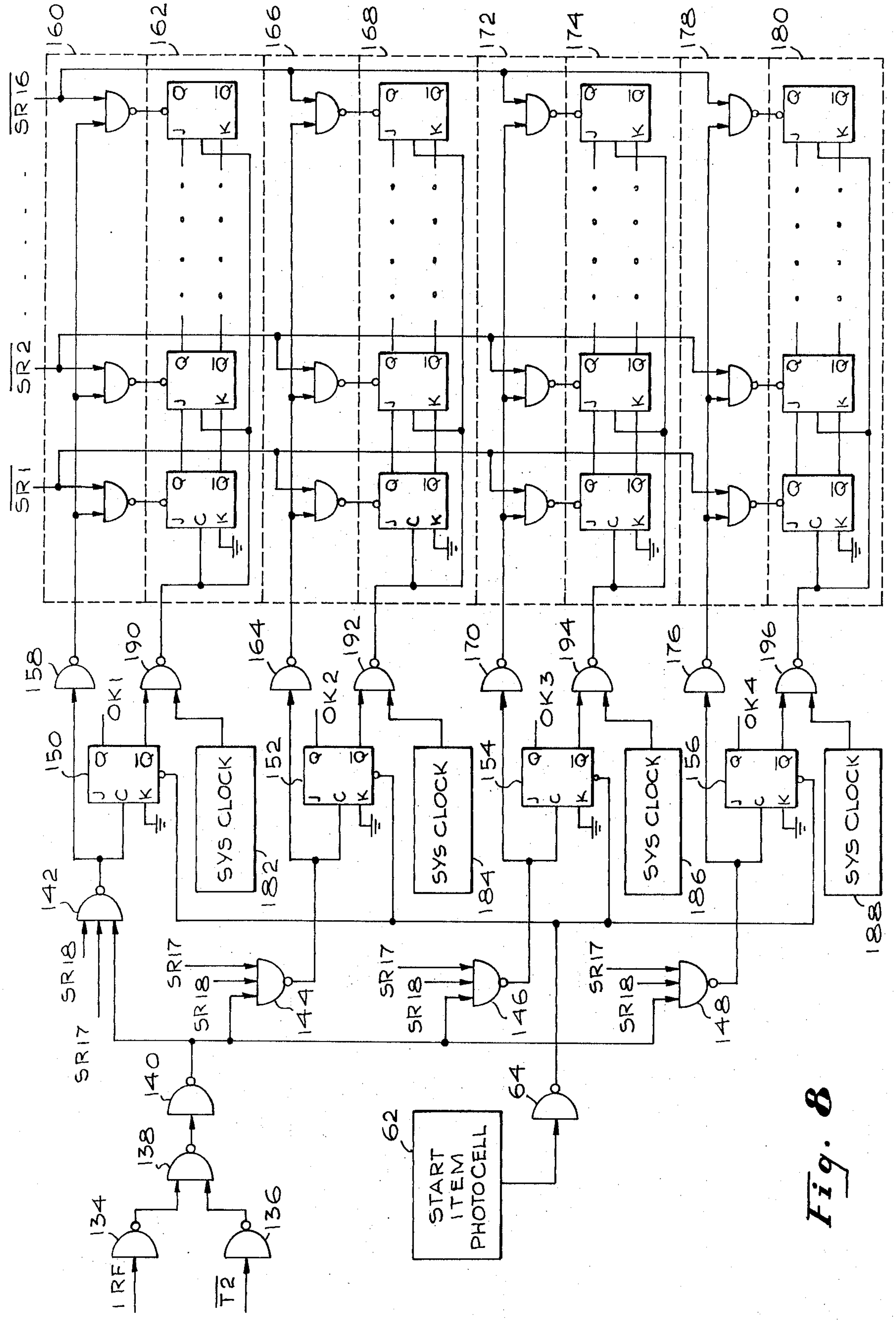

In this way one can store only a few types of tags and would still have the ability to represent the large number of codes. For example, 100 types of code stock would represent $10^{10}$ codes. FIGS. 6, 7 and 8 illustrate the circuit logic required for reading a multiple field tag and from the information derived from the A Field directing the B Field information into a location as derived from the A Field information. FIG. 6 is somewhat identical with the circuit arrangement shown in FIG. 4. Similar functioning rectangles in FIG. 6 representative of circuitry in FIG. 4 will have the same reference numerals applied to them as are used in FIG. 4. Thus, the red or green signal, derived from a band or ring in a tag which is being read, is converted into electrical signals at the output of the red and green photocells respectively 40,46. The transition detecting circuit 120, performs the same function as the double pulse forming circuits 42, 48 in FIG. 4, and provides as an output a pulse each time the detecting mechanism perceives the scanning beam entering the ring and each time the scanning beam leaves the ring. One shot circuit 54 has its timing arranged so that it outputs exactly one pulse for each ring transition. One shot 122 to which the output of the transition detecting circuit is also applied, is timed to remain with its output high so long as pulses are applied rapidly enough to the input. The speed of scanning a tag or label is maintained sufficiently high so that one shot 122, output remains high until after a tag has been read. Shortly after reading a tag, the output of one shot 68 goes low and resets or clears the counter circuit 56.

The output from one shot 54 advances counter 56 in the same manner as we have described in connection with FIG. 4. Counter 56 triggers gate 58 when it reaches its 19 count (signaling the half way point) and triggers gate 60 when it reaches its 37th count (signaling completion of the reading of the label.) The output of the gate 58 sets a latch circuit comprised of NAND gates 74 and 76 which are cross-coupled to one another, so that a $T_1F$ output goes low. The latch circuit is reset when the output of the one shot circuit 122 goes low. At this time a $\overline{T_1F}$ goes low. The output of the 37 count gate 60, which signals the end of the reading period is designated as $\overline{T2}$. The output signals from one shot circuit 54 also constitute pulse signals which are applied to the succeeding circuitry.

The succeeding circuitry constitutes the circuits shown in FIG. 5 with some additional circuits. FIG. 7 shows so much of FIG. 5 as to orient one with the locations where the additional circuitry should be connected to that shown in FIG. 5. Thus, the register 86 is reproduced in FIG. 7. This is the register to which the decoded bits are entered. These decoded bits correspond to the red and green signals derived from the tag which is read. The outputs from the bits stored in the register 86 are represented as SR1 and $\overline{SR1}$ corresponding to the Q and $\overline{Q}$ outputs of the first stage of the register. SR2 and $\overline{SR2}$ are the outputs derived from the Q and $\overline{Q}$ outputs of the second stage of the register. The remaining outputs from the remaining stages bear the numbers corresponding to the number of the stages. It should be appreciated that if the A Field includes the first two rings of the tag, then the data derived from the A Field is the data outputed from the last two stages SR 18, SR 17 of the register. The B Field data will be that in the remaining stages in the register.

The error flip-flop corresponds to the flip-flop 110 shown in the FIG. 5. A flip-flop 124 is driven to its set state in response to green representative pulses from the green photocells 46 and clock pulses from one shot 54. The flip-flop is reset when the "clear" line goes low. A flip-flop 126 is set in response to red representative pulses from the photocells 40 and is reset when the clear line goes low. The Q output of flip-flop 124, together with the Q output of flip-flop 126 is applied to a NAND gate 128. The output of this NAND gate is applied to a succeeding NAND gate 130. The output of this NAND gate is applied to a succeeding NAND gate 130, acting as an invertor. The output of the NAND gate 130 is applied to a NAND gate 132, which has as its second input the $\overline{Q}$ output of flip-flop 110. The output of NAND gate 132 is designated as a signal ERF. This signal is provided if either a red or a green signal is missing. This gives an error reading in case one photo cell is not functioning. Thus, if the ERF output is high it would indicate something is wrong with the detection circuit or if the code detected is in error.

Referring now to FIG. 8, there may be seen a schematic of the logic which separates the data in the B Field in accordance with the data derived from the A Field. The ERF signal from NAND gate 132 in FIG. 7 is applied to a NAND 134. The $\overline{T2}$ signal, which is the output of the 37th count gate in FIG. 6 is applied to a NAND gate 136. The outputs of NAND gates 134 and 136 are applied to a NAND gate 138. Its output is applied to a NAND gate 140.

The output of NAND gate 140, which is the inverted output of NAND gate 138, is applied as the first input to NAND gates 142, 144, 146 and 148. NAND gate 142 has as its two other inputs $\overline{SR17}$ and $\overline{SR18}$. NAND gate 144 has as its other two inputs SR17 and $\overline{SR18}$. NAND gate 146 has as its other two inputs $\overline{SR17}$ and SR18. NAND gate 148 has as its other two inputs SR17 and SR18.

The output of NAND gate 142 is applied to the clock input of a flip-flop 150 to drive it to its set state with its Q output high. Flip-flop 150 together with similarly situated flip-flops 152, 154 and 156, are all reset by an output which is generated whenever a new package enters the detecting region. This occurs by operation of a start photocell 62 (see FIG. 4) whose output is applied to an inverter 64. The output of the inverter 64 is used to reset all of the flip-flops 150–156.

The output of the NAND gate 142 is applied through an inverting NAND gate 158, as an enabling input to a set of NAND gates enclosed in a dotted rectangle and collectively designated by the reference numeral 160. This set of NAND gates 160 serves the function of transferring the contents of the register 86 in FIG. 6 into a register 162, from the first stage to the 16th stage of the register, which represents the B Field of a label which has been read.

NAND gate 144 applies its input through an invertor 164 to a collective set of NAND gates 166. These NAND gates serve the function of transferring the contents of register 86 into another register 168.

NAND gate 146 applies its output through an inverting NAND gate 170 as an enabling input to a set of NAND gates 172. NAND gates 172 serve the function of transferring the contents of register 86 into a register 174. The contents which are transferred are those corresponding to the bits which have been read from the B Field of the tag.

NAND gate 148 applies its output as an enabling input through invertor 176 to a set of NAND gates 178. These NAND gates serve to transfer the contents of register 86 from the third stage to the 16th stage into a register 180.

When a package or an item enters the detecting station, the start item photocells 82 initiates a signal which resets all of the flip-flops 150, 152, 154 and 156. These flop-flips may be called the indicating flip-flops since they serve the function of signalling with their Q outputs whenever an accepted code has been entered into one of the registers. The $\overline{Q}$ outputs of flip-flops 150, 152, 154 and 156 enable NAND gates 190, 192, 194 and 196.

A summary of the operation of this system is as follows:

The rectangles labeled "SYS Clock", respectively 182, 184, 186 and 188, represent clock signal sources, which are used when it is desired to reset the registers 162 and 168, 174, 180. These reset signals are respectively applied to the now enabled NAND gates 190, 192, 194, and 196. The outputs of these NAND gates are applied to the clock inputs of respective registers 162, 168, 174 and 180, thereby resetting them.

The circuitry of FIGS. 6 and 7 function as described to detect and check acceptable codes. If the code is accepted then both the ERF and $\overline{T2}$ signals are low. This applies a high signal to one input of each one of the NAND gates 142, 144, 146 and 148. The one of these NAND gates which is enabled is determined by the first two bits which are read into the register 86. Since the $\overline{T2}$ signal does not occur until the last bit of the code which has been read is processed, the time of the enabling of one of the NAND gates 142–148 to occur also takes place after the last bit has been processed. Thus, assuming the first two bits in the A Field are SR17 and SR18. NAND gate 142 is enabled. It applies its low output to invertor 158. The output of NAND gate 158 enables the group of the NAND gate 160 whereby the contents of register 86 is transferred into register 162.

The selective transfer of the contents of register 186 into one of the registers 162, 168, 174 or 180 is determined by the decoding of the first two bits of the A Field in the manner that has been explained. The register contents can be thereafter utilized in a manner well known in the art.

With the foregoing arrangement, several tags may be read quite rapidly since the information contained on any tag is stored and used in the decoding and the checking arrangement may proceed with the next tag without interferring with the storage and utilization functions.

From the foregoing it will be appreciated that there has been described and shown a noval and useful system for reading remotely placed coded indicia as it passes by a detecting station, regardless of the angle that the indicia makes with the detecting apparatus and regardless of the distance of the indicia from the detecting apparatus so long as it can be illuminated nd bisected by the scanning laser beam.

What is claimed is:

1. A system for reading coded indicia applied to a parcel regardless of the angle made by said indicia with detecting apparatus which is remotely located from said parcel comprising a detecting station including means for emitting a high intensity substantially non-diverging light beam;

means for repetitively sweeping said light beam through a plane;

means for moving said parcel through said plane with its coded indicia positioned to be intersected by said light beam;

photo cell means positioned to receive light emitted by said indicia caused by the illumination thereof by said light beam emitting means;

counting means responsive to the output of said photocell means for determining that a proper number of bits of data have been generated by said photocell means in response to the light received from said coded indicia;

storage means connected to receive the output from said photocell means for storing half of the bits of data generated by said photocell means with responsive to the light received from the coded indicia;

means for comparing the bits of data which are stored with the remaining bits of data generated by said photocell means in response to the light received from the remaining half of said coded indicia and producing an error signal when an unidenticality is detected;

means rendered inoperative in the presence of an error signal for decoding a portion of the bits stored in said storage means; and means responsive to said decoding means for utilizing the remaining bits of data in said storage means in accordance with the information decoded by sid decoding means.

2. Apparatus as recited in claim 1 wherein said detecting means includes a plurality of gate detection means each one of which is enabled in response to different predetermined data bit combinations in said portion of said data bits stored in said storage means;

a plurality of storage means;

a different data gate means for each one of said plurality of storage means, each one of said data gate means coupling said storage means which stores the remaining data bits with a different one of said plurality of storage means; and means for applying the outputs of each one of the detection gate means to a different one of the inputs of said plurality of storage gate means for enabling the one of said storage gate means to transfer the remaining bits in said storage means to one of said plurality of said storage means when the associated detecting gate means has all of the predetermined combination of data bits present at its input.

3. A system as recited in claim 1 wherein there is included a plurality of separate storage means;

means responsive to a portion of the bits of data stored in said storage means for transferring the remaining bits of data into a predetermined one of said plurality of storage means in accordance with the information contained in said portion of said bits of data; and means responsive to an error signal for holding said means for transferring data bits inoperative.

4. In a system as recited in claim 1 wherein there is included means responsive to a portion of the code bits stored in said storage means for indicating utilization to be given to the remainder of the code bits which are stored in said means for storing.

5. Apparatus as recited in claim 1 wherein said high intensity narrow light beam emitting means is an ultraviolet laser, and said coded indicia is made with material which fluoresces in color in response to said ultraviolet laser light.

6. Apparatus as recited in claim 1 wherein said coded indicia has the form of concentric color markings spaced by no color regions; and said storage means connected to receive the output from said photocell means includes means responsive to a no color region being detected by said photocell means for storing a binary bit which is the same as the binary bit which was stored just prior to the occurrence of said no color region.

* * * * *